J. F. COURSON.
DRAFT GEAR.
APPLICATION FILED APR. 4, 1918.
1,300,700.
Patented Apr. 15, 1919.
3 SHEETS—SHEET 1.
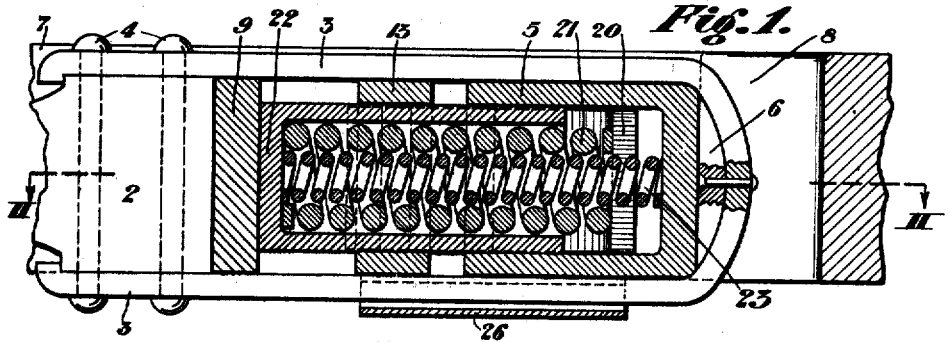
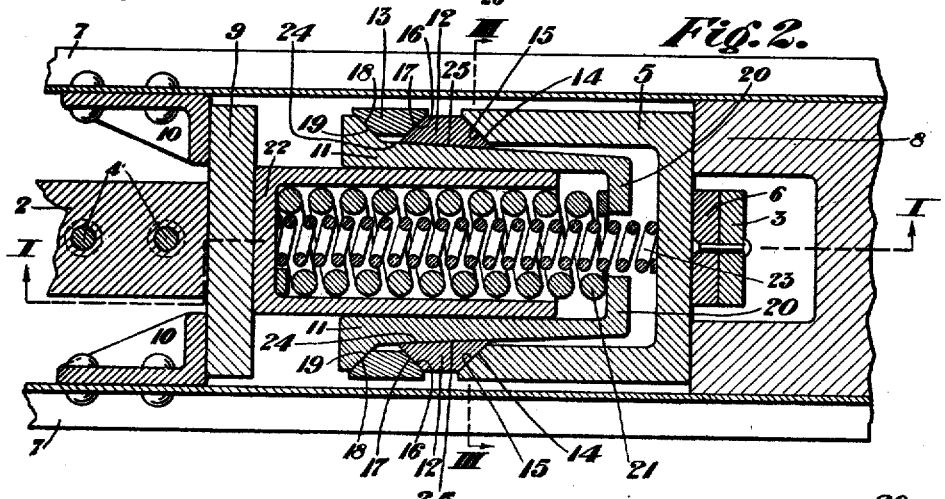
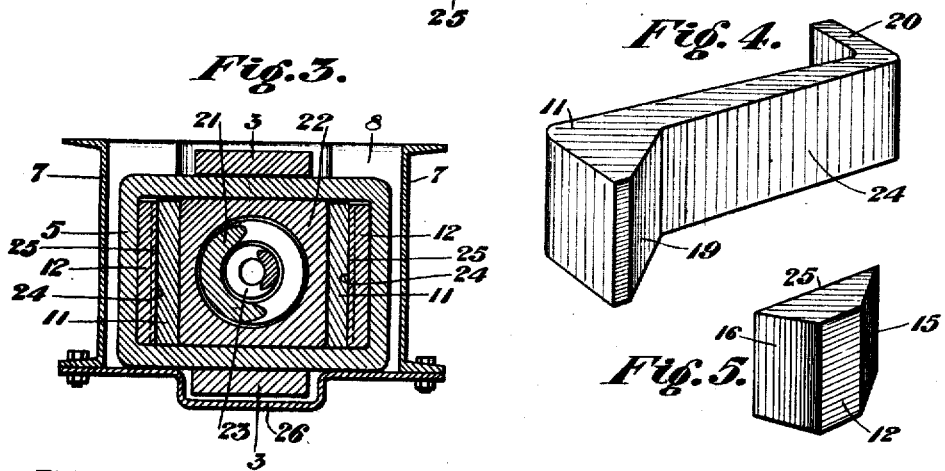

J. F. COURSON.
DRAFT GEAR.
APPLICATION FILED APR. 4, 1918.
1,300,700.
Patented Apr. 15, 1919.
3 SHEETS—SHEET 2.
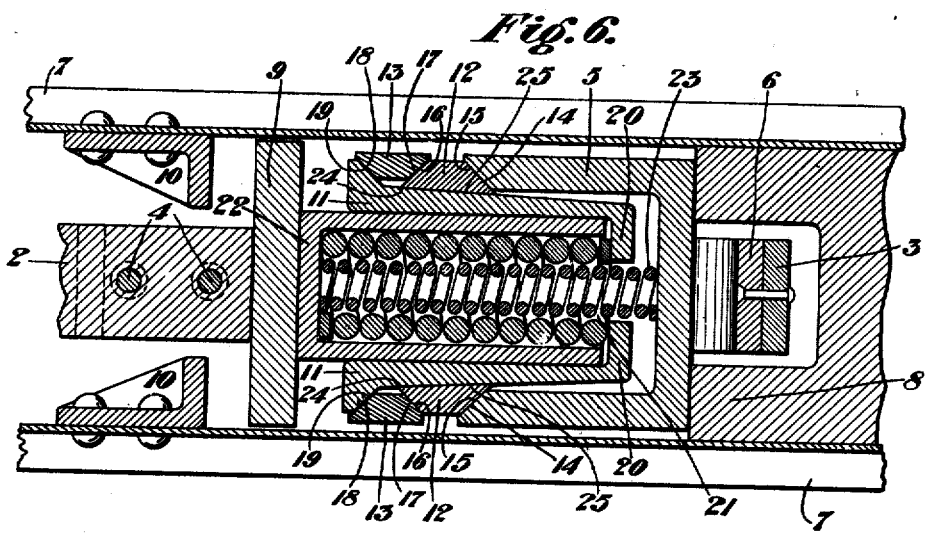
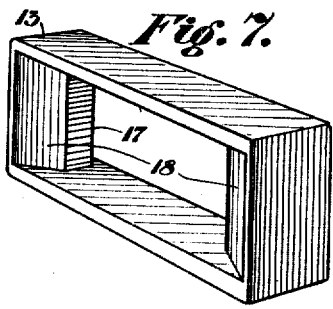
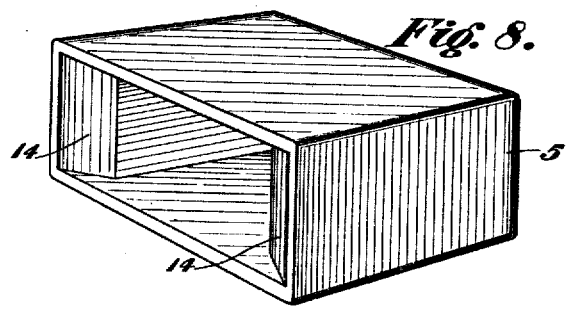
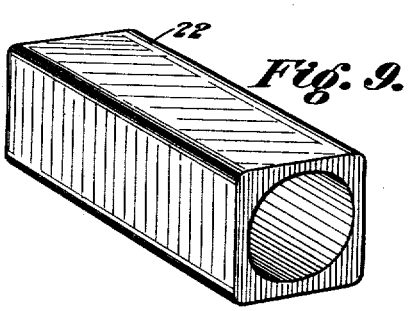
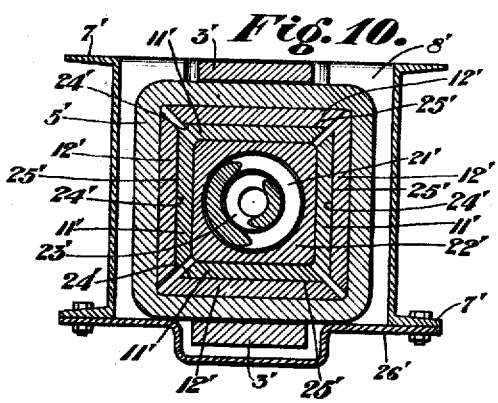
Witnesses:
Inventor:

J. F. COURSON.
DRAFT GEAR.
APPLICATION FILED APR. 4, 1918.

1,300,700. Patented Apr. 15, 1919.
3 SHEETS—SHEET 3.

Witnesses: Inventor:
Edwin Orneb John F. Courson
Lois Brneman by C. M. Clarke
Atty

UNITED STATES PATENT OFFICE.

JOHN F. COURSON, OF PITCAIRN, PENNSYLVANIA.

DRAFT-GEAR.

1,300,700.    Specification of Letters Patent.    Patented Apr. 15, 1919.

Application filed April 4, 1918. Serial No. 226,586.

*To all whom it may concern:*

Be it known that I, JOHN F. COURSON, a citizen of the United States, residing at Pitcairn, in the county of Allegheny and State of Pennsylvania, have invented certain new and useful Improvements in Draft-Gears, of which the following is a specification.

My invention consists in an improvement in draft gears of the general class utilizing springs and friction members in connection with expanding wedge mechanism, operable upon buffing or pulling to effect resistance to such strains through assembled co-acting parts adapted to be mounted in a car underframe and connected with the usual drawbar.

The construction utilizes friction exerting mechanism having wedge faces of acute or sharp angles for the generation of high resisting pressure, in connection with incorporated wedge elements utilizing blunt angle faces, coöperable therewith and adapted to provide for easy and quick release of the gear in connection with spring action, throughout its various operations either in buffing or pulling, as more fully hereinafter described.

Certain preferred constructions are illustrated in the accompanying drawings, in which:

Figure 1 is a longitudinal vertical sectional view through a complete gear as assembled, utilizing friction creating mechanism at opposite sides of the gear only, the parts being shown in normal extended position as indicated by the line I—I of Fig. 2;

Fig. 2 is a similar horizontal sectional view indicated by the line II—II of Fig. 1;

Fig. 3 is a cross sectional view indicated by the line III—III of Fig. 2;

Fig. 4 is a perspective detail view of one of the inner compound angle friction wedges;

Fig. 5 is a similar view of one of the outer compound angle friction wedges;

Fig. 6 is a view similar to Fig. 2 showing the gear under compression in buffing.

Fig. 7 is a perspective detail view of the angle faced retaining frame;

Fig. 8 is a similar view of the gear casing;

Fig. 9 is a similar view of the spring cup friction member;

Fig. 10 is a cross sectional view similar to Fig. 3 but showing an assembled series of four sets of friction creating members within a substantially square casing;

Fig. 15 is a partial sectional detail view similar to Fig. 13 but showing a modified construction of the central friction member in wedge form.

Figure 11:
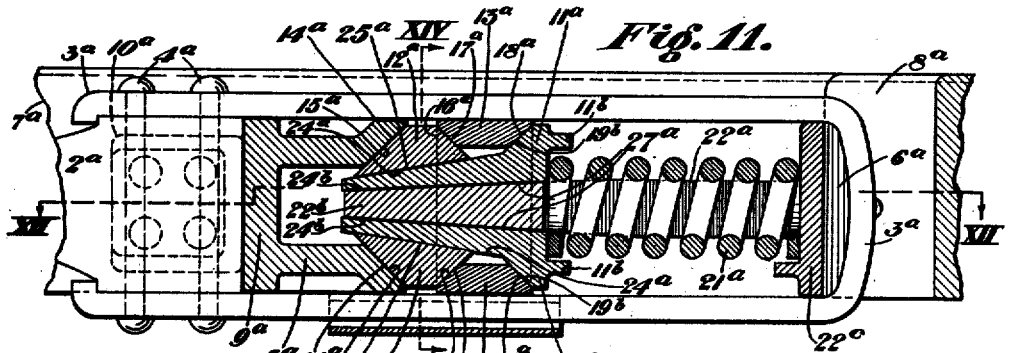
Fig. 11 is a longitudinal sectional view similar to Fig. 1 showing a modified construction as to the central friction member, indicated by the line XI—XI of Fig. 12.

In the drawings, 2 represents the drawbar of the coupler connected with the front end portions of the U-shaped yoke 3 by transverse bolts or rivets 4 extending therethrough, as shown, and of usual construction. Yoke 3 embraces the gear casing or box 5, passing around its rear portion preferably with an intervening filler block 6, and thus providing a solid pulling connection between the casing and the drawbar while providing for free rearward movement of the yoke independent of the casing, in buffing.

Casing or box 5, in the construction illustrated, is generally rectangular in cross section adapting it to practically fill the space between center sills 7, 7. The casing, with its associated parts, is capable of a limited range of longitudinal movement between a rear reinforcing abutment 8 secured solidly between the center sills, toward a forward follower plate 9, which in turn abuts forwardly against the usual stops 10, 10.

The active friction creating elements of the gear are the inner compound angle friction wedges 11, 11, and the central friction member 22, as controlled by the outer compound angle friction wedges 12, 12, the angle faced retaining frame 13, and the gear casing or box 5. The latter is provided with blunt angle faces 14, flaringly disposed at the front open end portion of the casing, as indicated in Fig. 8, and adapted to provide bearing faces for the corresponding blunt angle faces 15 of wedges 12.

Said wedges are provided with rear and front blunt angle faces 15, 16, respectively, faces 16 in turn being in engagement with similar blunt angle faces 17 of angle faced retaining frame 13. Said frame which is, like casing 5, generally rectangular in form as shown in Fig. 7, is also provided with front blunt angle wedge faces 18, formed across the end portion of the frame and adapted to engage similar blunt angle wedge faces 19 at the outer front end portions of compound angle friction wedges 11. Said friction wedges, as shown in Fig. 4, are provided with inner terminal retaining lips or flanges 20 adapted to provide bearings for the inner terminal of spring 21, which bears by its front end against the inner closed end portion of spring cup friction member 22 (Fig. 9).

Said friction member is hollow and embraces spring 21, and abuts by its closed end forwardly against follower plate 9, and also provides by such front closed end portion an inner bearing for the front end of an inner cushioning spring 23 which bears by its rear end against the inner end portion of casing 5.

Friction wedges 11 are provided on their outer longitudinal faces with acute or sharp angles 24, as contrasted to the blunt angle faces 19, which acute angle faces provide, by their engagement with the inner acute angle faces 25 of compound angle friction wedges 12, for powerful action thereagainst upon relative longitudinal movement of one or the other.

When assembled in the manner illustrated in Figs. 1, 2 and 6, and upon the creation of either buffing or pulling strains, relative movement of the parts, i. e. of member 22 inwardly or member 5 outwardly, will effect a preliminary compression of springs 21 and 23. Spring action against terminal flanges 20 of the compound blunt angle friction wedges 11, and against central member 22 and casing member 5, maintains the parts in normal operative position. Powerful lateral wedging movement is imparted to friction wedges 12 by reason of their inner acute angle faces 25 and co-acting similar faces 24, and in connection with the action of the several sets of blunt angle faces 18—19, 16—17 and 14—15, the combined action of which effect inward pressure of wedges 11 against friction member 22 in proportion to the extent of relative movement of the parts, as will be readily understood.

These several sets of blunt angle faces, due to lateral expanding movement of compound angle friction wedges 12, act, in effect, to counteract the inward moving tendency toward casing 5 of friction wedges 11, due to the fact that wedge faces 17—18 of the angle faced retaining frame 13, can only operate to move said element longitudinally and not laterally, thus effecting longitudinal movement of wedges 11 by action on their faces 19. There is, in effect, a longitudinal extension of the retaining frame 13 away from main casing 5, an accelerated longitudinal movement of friction wedges or shoes 11, and a steadily increasing pressure thereby against the central friction member 22. Members 11 and 22 moving in opposite directions in either buffing or pulling, this effects a combined wedge action and frictional resistance of very considerable degree, because of the ample contacting area of the engaging frictional and wedge faces.

By reason of the blunt or obtuse angles of the wedge faces, they insure quick and easy release of the parts, upon termination of buffing or pulling strains, and it will, of course, be understood that the action of the gear is substantially the same with either class of strains. The gear is essentially self-contained as to its three main elements, to wit, casing 5, friction shoe wedges 11, and spring cup friction member 22, effectually inclosing the contained springs, while the front retaining frame 13 with the intervening friction wedges 12 make these two members substantially movable extensions of the casing or box 5.

In Fig. 10 I show a modified construction providing a four sided gear, as to the friction members surrounding the central friction member 22', the casing 5' being substantially square in cross section. Correspondingly four several sets of wedges 12' and friction shoe wedges 11' are arranged as shown, providing for equal pressure and friction at all four sides of the central member, and thereby amplifying the frictional area and resulting resistance. The operation otherwise is as already described, and the other parts are correspondingly indicated by the same numerals, primed.

In the construction of Figs. 11–15 inclusive, the same general arrangement of parts is shown, as in the principal figures, except that in place of a spring cup friction member 22 I have provided a spring yoke friction member 22ª having at its inner portion a central terminal friction face wedge 22ᵇ. Spring yoke 22ª, like spring cup member 22, bears by its opposite end against one of the movable elements of the gear frame, but in this case against the opposite end portion from the usual location of follower 9, and, as shown, against the rear end portion of yoke 3ª.

For such yoke engagement, the rear end of the spring yoke 22ª is provided with a terminal plate 22ᶜ which is engaged by the rear end of the yoke and the intervening filler block 6ª, as shown.

The central body portion of spring yoke 22ª is centrally apertured like member 22, as indicated at 22ᵈ, for the insertion of spring 21ª which bears by its rear end against terminal 22ᶜ and by its forward end against enlarged terminals of compound angle friction wedge shoes 11ª. Said members are preferably provided with retaining lips 11ᵇ adapted to provide an inclosing cup formation for retention of spring 21ª. Friction wedge shoes 11ª are provided, like members 11, with outer acute angle wedge faces 24ª engaging faces 25ª of wedges 12ª and blunt wedge faces 19ᵇ, coacting with blunt angle wedge faces 18ª and also with inner acute angle faces 24ᵇ engaging faces 27ª of wedge 22ᵇ.

Likewise, blunt wedge faces 17ª of said frame engage wedge faces 16ª of wedge 12ª, the opposite blunt faces 15ª of which wedges (12ª) engage the corresponding blunt angle faces 14ª of gear casing or box 5ª.

Figure 12:
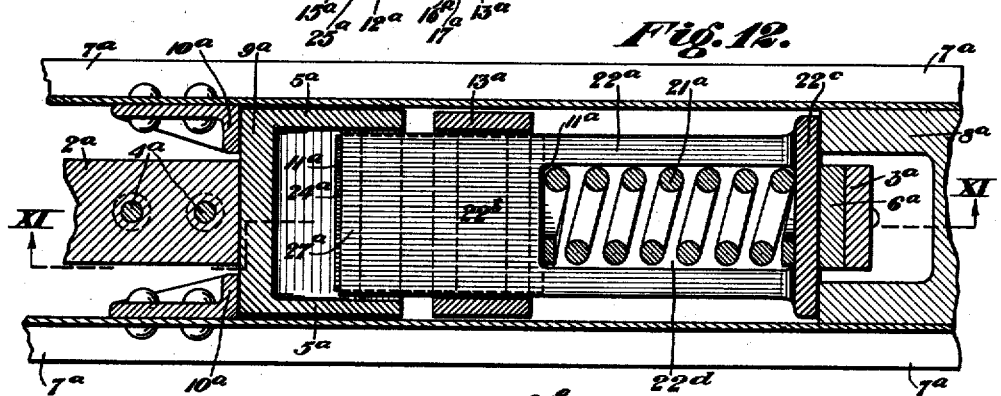
Fig. 12 is a horizontal sectional view indicated by the line XII—XII of Fig. 11.
Figure 13:
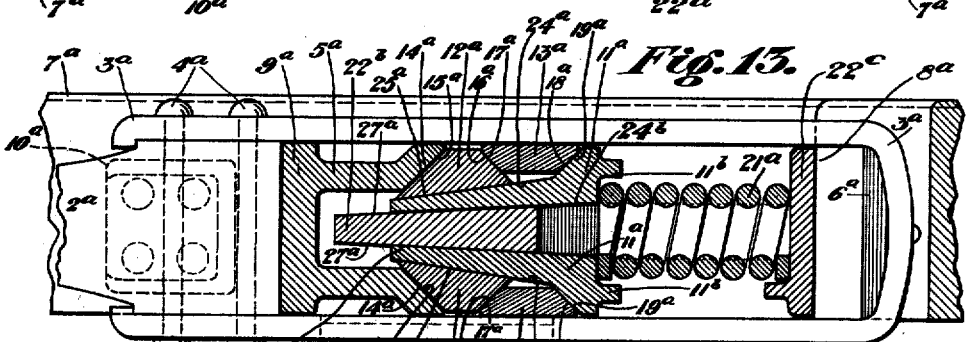
Fig. 13 is a view similar to Fig. 11 showing the gear compressed under buffing strains.
Figure 13:
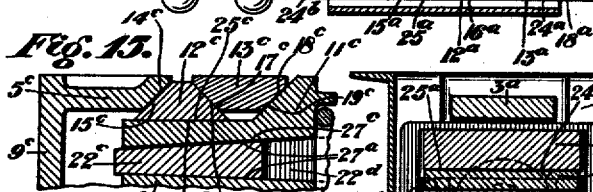
Figure 14:
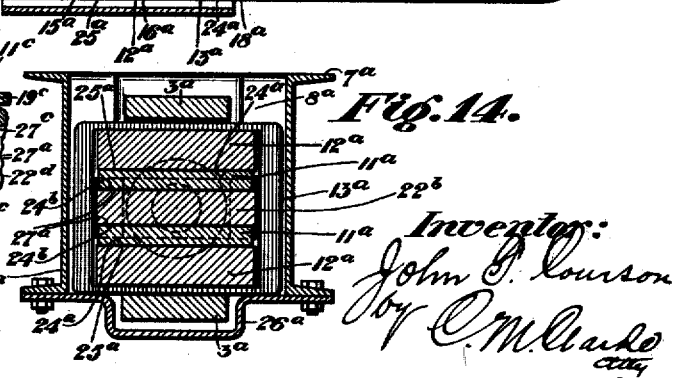
Fig. 14 is a cross sectional view indicated by the line XIV—XIV of Fig. 11.

The several parts in the above described construction are reversed in position, as shown in Figs. 11, 12 and 13, the closed end of the casing abutting directly against the rear end of drawbar 2ª, and providing by such closed end 9ª the substantial equivalent of the follower 9, and like such follower engaging forwardly against stops 10ª under draft stresses.

Casing 5ª in such construction is similar to casing 5, having side portions and the upper and lower extended flaring portions having the wedge terminal members which engage against the compound angle friction wedges 12ª. These are comparatively short and relatively heavy in cross section, providing substantial rigid bearing members and are inclosed between the upper and lower yoke members, and held thereby against the rear end of the drawbar.

The construction and operation in either buffing or pulling strains is substantially the same as that of the main gear already described, with the supplementing friction creating action of wedge terminal 22ᵇ of the spring yoke 22ª.

Said member is provided at opposite sides with acute angle wedge faces 27ª which operatively engage inner contacting acute angle wedge faces 24ᵇ of compound angle friction wedges 11ª. Said acute angle faces are slightly more acute than outer acute angle wedge faces 24ª which engage inner faces 25ª of friction wedges 12ª. There is thus a double set of acute angle wedge faces in engagement in the associated combination of the parts, including the several contacting blunt angle wedge faces already pointed out, whereby I provide, in the assembled elements, a compact construction embodying means for creating a very high degree of expansive friction-creating elements, in combination with the series of blunt releasing angles and faces, which contribute to easy and quick release of the parts, upon termination of the usual strains.

In Fig. 15 the construction is generally the same as above described, except that the compound angle friction wedge 11ᶜ is provided, like wedge 11ª, with the inner acute angle face 27ª, and with the obtuse angle wedge face 19ᶜ, but in place of the acute angle wedge face 24ª, the face 24ᶜ is made substantially parallel with the longitudinal center line of the gear, and engages a similar face 25ᶜ of the compound angle friction wedge 12ᶜ. It also has an inner acute angle face 27ᶜ engaging the face of central wedge 22ᶜ.

The various other members of the assembled gear, providing the blunt angle wedge faces are substantially the same in construction and operation, as above described, and are so indicated in Fig. 15 by corresponding numerals having the exponent c.

The construction and operation of the gear, in either design, will be readily understood and appreciated by all those familiar with this type of mechanism. It embodies in very compact, cheap and easily assembled forms, a highly efficient unitary gear, capable of generation of a high degree of resistance with free release, and with ready adaptation to its mounting in the usual car framing. It avoids the necessity of cutting any of the parts, either in original installation or upon renewal in case of breakage or wear, and is capable of performing its intended functions in a continuous satisfactory manner.

The gear of either form may be supported between the center sills 7 by the usual cross plate 26 or 26ª connected with the sills in the usual manner, and the construction avoids the necessity of any special finishing treatment, as the members may be readily cast or forged to shape for use.

Changes or variations may be made in the relative proportions, sizes, or design of the several parts, or otherwise, as required by the conditions of intended service, but all such changes are to be considered as within the scope of the following claims.

I claim:—

1. In a friction draft gear, a central friction member and a pair of lateral embracing co-acting friction wedges adapted to move thereon, a spring adapted to exert pressure on each of said members, a wedge faced casing, a wedge faced retaining frame engaging said friction wedges, compound angle friction wedges engaging the casing, retaining frame and said co-acting friction wedges respectively, and means connecting said mechanism with a drawbar.

2. A friction draft gear consisting of a central friction member, relatively movable co-acting friction wedges engaging said member at opposite sides, a spring engaging said members operable to move one or the others, a casing having wedge faced terminals, a pair of compound angle friction wedges engaging said terminals and said friction wedges, an angle faced retaining frame engaging said relatively movable coacting friction wedges and compound angle friction wedges respectively, a drawbar, and means embracing said parts and connecting them with the drawbar.

3. In combination, a central friction cup, relatively movable friction members engaging said cup at opposite sides and having outer wedge faces and terminal abutments, a spring engaging the cup and said abutments respectively, a casing having wedge faces, a drawbar, a yoke connecting the casing and drawbar, and wedge mechanism interposed between the wedge faces of the casing and the wedge faces of the cup-engaging friction members respectively.

4. In combination, a central friction cup, relatively movable friction members engaging said cup at opposite sides and having outer wedge faces and terminal abutments, a spring engaging the cup and said abutments respectively, a casing having wedge faces, a drawbar, a yoke connecting the casing and drawbar, and an angle faced retaining frame and co-acting wedges interposed between the wedge faces of the casing and the wedge faces of the cup-engaging friction members respectively.

5. In combination with rear and front abutments, a drawbar, and a connecting yoke; a wedge faced casing, compound angle wedges and an angle faced retaining frame in assembled relation thereto, a pair of longitudinal compound angle friction wedges within said members and engaged by the compound angle wedges and the retaining frame, a central friction member slidably engaging the inner faces of said longitudinal friction wedges, and a coiled spring engaging a portion of the central friction member by one end and portions of the longitudinal friction wedges by its other end, substantially as set forth.

In testimony whereof I hereunto affix my signature.

JOHN F. COURSON.

Copies of this patent may be obtained for five cents each, by addressing the "Commissioner of Patents, Washington, D. C."